(12) United States Patent
Matsuda et al.

(10) Patent No.: US 8,293,817 B2
(45) Date of Patent: Oct. 23, 2012

(54) METHOD FOR MANUFACTURING NATURAL RUBBER

(75) Inventors: Takashi Matsuda, Hiratsuka (JP); Makoto Ashiura, Hiratsuka (JP); Tetuji Kawazura, Hiratsuka (JP); Keisuke Chino, Hiratsuka (JP)

(73) Assignee: The Yokohama Rubber Co. Ltd. (JP)

( * ) Notice: Subject to any disclaimer, the term of this patent is extended or adjusted under 35 U.S.C. 154(b) by 0 days.

(21) Appl. No.: 13/142,420

(22) PCT Filed: Dec. 25, 2009

(86) PCT No.: PCT/JP2009/071635
§ 371 (c)(1),
(2), (4) Date: Jul. 14, 2011

(87) PCT Pub. No.: WO2010/074245
PCT Pub. Date: Jul. 1, 2010

(65) Prior Publication Data
US 2011/0269881 A1    Nov. 3, 2011

(30) Foreign Application Priority Data

Dec. 25, 2008 (JP) .................................. 2008-330578
Jul. 9, 2009 (JP) .................................. 2009-163198

(51) Int. Cl.
*C08J 3/28* (2006.01)
(52) U.S. Cl. ........ 523/300; 523/340; 523/342; 524/157; 524/158

(58) Field of Classification Search .................. 524/157, 524/158; 523/300, 340, 342
See application file for complete search history.

(56) References Cited

U.S. PATENT DOCUMENTS

| 6,380,283 | B1 | 4/2002 | Perrella et al. |
| 6,943,212 | B2 | 9/2005 | Ichikawa et al. |
| 2006/0036025 | A1 | 2/2006 | Ichikawa et al. |
| 2009/0247677 | A1 | 10/2009 | Kawazura et al. |

FOREIGN PATENT DOCUMENTS

| IN | 2003CH00710 | * | 7/2005 |
| JP | 09-111053 | | 4/1997 |
| JP | 2005-023140 | | 1/2005 |
| JP | 2006-070137 | | 3/2006 |
| JP | 2008-255162 | | 10/2008 |
| WO | WO 2007049460 A1 | * | 5/2007 |

* cited by examiner

Primary Examiner — Ling Choi
Assistant Examiner — Wenwen Cai
(74) Attorney, Agent, or Firm — Thorpe North & Western LLP

(57) ABSTRACT

A method for manufacturing natural rubber according to an embodiment of the present technology includes: adding to a natural rubber latex at least one type of a predetermined sulfonic acid selected from the group consisting of a monoalkyl sulfonic acid, a polyoxyethylene alkyl ether sulfonic acid, and an alkylbenzene sulfonic acid; and, thereafter, removing moisture from the mixture of the natural rubber latex and the sulfonic acid.

10 Claims, 1 Drawing Sheet

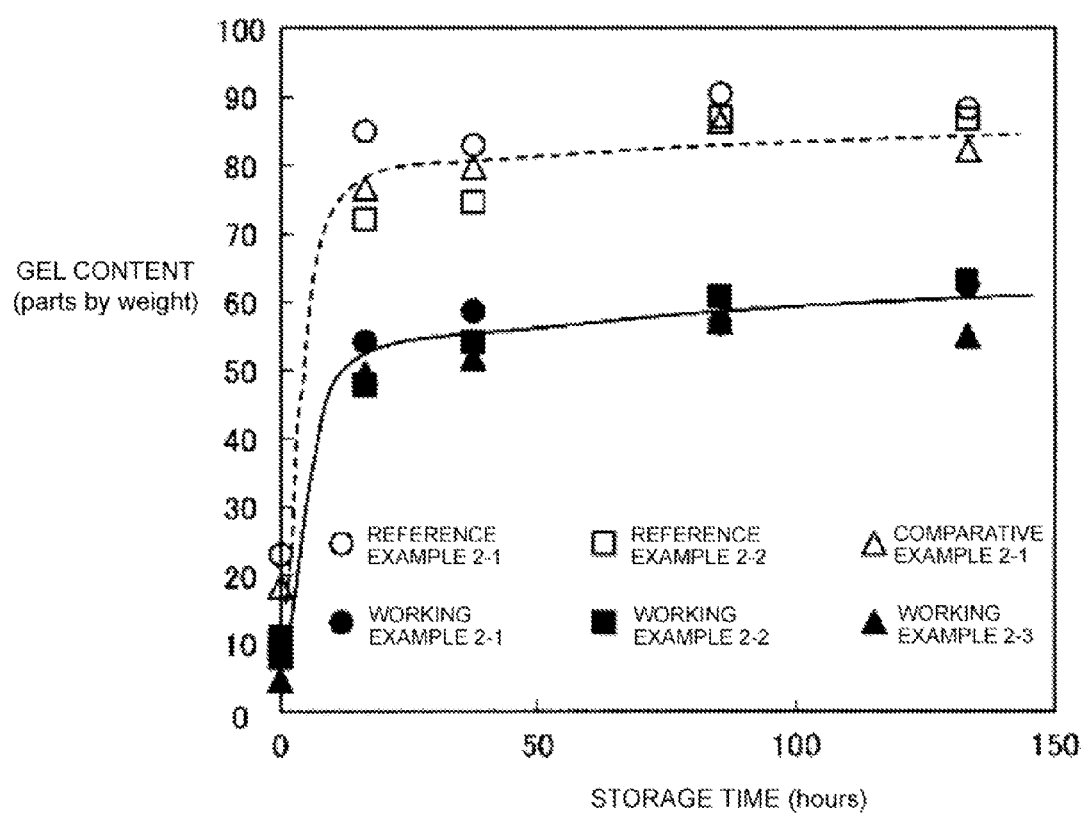

METHOD FOR MANUFACTURING NATURAL RUBBER

BACKGROUND

1. Technical Field

The present technology relates to a method for manufacturing natural rubber, and particularly relates to a method for manufacturing natural rubber wherein viscosity can be lowered and processability can be enhanced by reducing a gel component in a natural rubber.

2. Related Art

Natural rubbers contain a high amount of a gel component compared to synthetic rubbers and, as a result, characteristically have a high rubber viscosity and various compounding agents are not easily dispersed uniformly therein. Therefore, when kneading a rubber composition that includes a natural rubber, the natural rubber must be masticated prior to kneading the various compounding agents in order to sufficiently break apart the rubber molecules, thereby lowering the rubber viscosity and increasing plasticity. However, problems exist in that conventional mastication requires a significant amount of energy and masticating leads to a decrease in the mechanical properties of the rubber. Furthermore, when time passes due to storing and transport of raw rubber as-is, the rubber viscosity increases due to an increase in the gel component. This leads to the problems of a reduction in the dispersibility of the compounding agents when kneading and a decline in processability.

To solve these problems, Japanese Unexamined Patent Application Publication No. 2005-23140A proposes lowering the viscosity of a natural rubber and suppressing an increase in rubber viscosity over time by mixing a viscosity stabilizer in a natural rubber latex, and then solidifying and drying this mixture.

Additionally, WO2007/049460 proposes a process for producing a solid natural rubber wherein a metal content in a natural rubber latex is reduced by treating the natural rubber latex with a water soluble ammonium salt, and then dried by spraying the product into a pulse wave atmosphere.

However, the method for manufacturing natural rubber described in Japanese Unexamined Patent Application Publication No. 2005-23140A has a problem in that the conventional viscosity stabilizers hydroxylamine, hydroxylamine sulfate, and hydroxylamine hydrochloride are not readily usable from a health and safety perspective due to high levels of danger and toxicity.

Additionally, the natural rubber obtained via the manufacturing method described in WO2007/049460 has a problem in that while rubber viscosity immediately following production can be reduced, the gel component increases with the passage of time, and this leads to the rubber viscosity increasing again. Compounding a viscosity stabilizer in order to suppress an increase in rubber viscosity over time is commonly known, however, viscosity stabilizers such as hydroxylamine, hydroxylamine sulfate, and hydroxylamine hydrochloride are not readily usable from a health and safety perspective due to high levels of danger and toxicity.

Therefore, there is a demand for a method in which these hydroxylamines are not used and there are no health and safety problems whereby the viscosity of a natural rubber is lowered and processability is enhanced by reducing the gel component of the natural rubber.

SUMMARY

The present technology includes a method for manufacturing natural rubber wherein viscosity is lowered by reducing the gel component of a natural rubber, and processability is enhanced by suppressing an increase in viscosity over time using a method that is problem-free from a health and safety perspective.

The present technology is described in the following (1) to (12).

(1) A method for manufacturing natural rubber including: adding to a natural rubber latex at least one type of sulfonic acid selected from the group consisting of a monoalkyl sulfonic acid expressed by Formula (1) below, a polyoxyethylene alkyl ether sulfonic acid expressed by Formula (2) below, and an alkylbenzene sulfonic acid expressed by Formula (3) below; and, thereafter, removing moisture from the mixture of the natural rubber latex and the sulfonic acid.

$$R^1SO_3H \tag{1}$$

(wherein $R^1$ is an alkyl group having from 1 to 20 carbons);

$$R^2O(CH_2CH_2O)_nSO_3H \tag{2}$$

(wherein $R^2$ is an alkyl group having from 1 to 20 carbons and n is an integer from 1 to 20);

$$R^3C_6H_4SO_3H \tag{3}$$

(wherein $R^3$ is an alkyl group having from 1 to 20 carbons).

(2) The method for manufacturing natural rubber described in (1), wherein the mixture of the natural rubber latex and the sulfonic acid is stirred at a temperature of from 0 to 100° C. for from 1 minute to 24 hours.

(3) The method for manufacturing natural rubber described in (1) or (2), wherein from 0.1 to 5.0 parts by weight of the sulfonic acid is added per 100 parts by weight of a solid component of the natural rubber latex.

(4) The method for manufacturing natural rubber described in any one of (1) to (3), wherein a treatment for removing magnesium present in the natural rubber latex is performed prior to adding the sulfonic acid.

(5) The method for manufacturing natural rubber described in (4), wherein the treatment for removing the magnesium in the natural rubber latex includes adding a water soluble compound, which produces a magnesium salt that has poor solubility in water with the magnesium, to the natural rubber latex; and removing the produced precipitate.

(6) The method for manufacturing natural rubber described in (4) or (5), wherein the water soluble compound is at least one selected from the group consisting of oxalic acid or various oxalic acid salts, various carbonates, boric acid or various boric acid metal salts, various metal hydroxides, phosphoric acid, and various phosphates; each of these salts not including magnesium.

(7) The method for manufacturing natural rubber described in any one of (4), (5), or (6), wherein the water soluble compound is at least one selected from the group consisting of ammonium phosphate, ammonium phosphate dibasic, and ammonium dihydrogen phosphate.

(8) The method for manufacturing natural rubber described in any one of (1) to (7), wherein the sulfonic acid is at least one selected from the group consisting of dodecyl sulfonic acid, dodecyl benzene sulfonic acid, and polyoxyethylene lauryl ether sulfonic acid.

(9) The method for manufacturing natural rubber described in any one of (1) to (8), wherein a method for removing the moisture from the natural rubber latex mixture does not include a step of solidifying using an acid.

(10) The method for manufacturing natural rubber described in any one of (1) to (9), wherein the moisture is removed by spraying the natural rubber latex mixture into an atmosphere of shock waves generated by pulse combustion.

(11) A natural rubber including a natural rubber obtained via the method for manufacturing natural rubber described in any one of (4) to (10), wherein a magnesium content is not more than 100 ppm.

(12) A rubber composition including a natural rubber manufactured via the method for manufacturing natural rubber described in any one of (1) to (11).

With the method for manufacturing natural rubber of the present technology, the gel component in the natural rubber can be reduced by adding at least one type of sulfonic acid selected from the group consisting of a monoalkyl sulfonic acid, a polyoxyethylene alkyl ether sulfonic acid, and an alkylbenzene sulfonic acid expressed by the Formulas (1) to (3) to the natural rubber latex. By manufacturing the natural rubber in a manner in which moisture is removed from the mixture, viscosity of the natural rubber can be lowered and processability thereof can be enhanced.

Additionally, with the method for manufacturing natural rubber of the present technology, the magnesium content in the natural rubber latex is reduced by performing a treatment for removing the magnesium in a natural rubber latex and, therefore, rubber viscosity is lowered. The gel component in the natural rubber can be reduced by adding at least one type of sulfonic acid selected from the group consisting of the monoalkyl sulfonic acid, the polyoxyethylene alkyl ether sulfonic acid, and the alkylbenzene sulfonic acid expressed by the Formulas (1) to (3) to the natural rubber latex from which the magnesium was removed and removing the moisture from the mixture and, therefore, the rubber viscosity can be further lowered. Moreover, it is possible to suppress the increase in rubber viscosity over time and, therefore, the lowered viscosity of the natural rubber can be stabilized and the processability thereof can be enhanced. Note that the sulfonic acids are different from conventional viscosity stabilizers such as hydroxylamine and the like in that they can be used without health and safety issues.

BRIEF DESCRIPTION OF THE DRAWING

FIG. 1 is a graph showing results of Working Examples and Comparative Examples of the present technology.

DETAILED DESCRIPTION

The present technology is explained in detail below. However, the present technology is not limited to the following embodiments. Furthermore, the components of the following embodiments include components that are essentially identical or that could be easily conceived by a person skilled in the art.

First Embodiment

A method for manufacturing natural rubber according to a first embodiment of the present technology includes: adding to a natural rubber latex at least one type of sulfonic acid selected from the group consisting of a monoalkyl sulfonic acid expressed by Formula (1) below, a polyoxyethylene alkyl ether sulfonic acid expressed by Formula (2) below, and an alkylbenzene sulfonic acid expressed by Formula (3) below; and, thereafter, removing moisture from the mixture of the natural rubber latex and the sulfonic acid.

(wherein $R^1$ is an alkyl group having from 1 to 20 carbons);

(wherein $R^2$ is an alkyl group having from 1 to 20 carbons and n is an integer from 1 to 20);

(wherein $R^3$ is an alkyl group having from 1 to 20 carbons).

In the method for manufacturing natural rubber of the present technology, filtered field latex extracted from rubber trees or a concentrated natural rubber latex made by treating the field latex can be used as the natural rubber latex. These latexes can be used alone or together. Although an amount of a solid component in the natural rubber latex is not particularly limited, it is preferably from 10 to 70 parts by weight. Here, the "solid component in the natural rubber latex" refers to all the solid components, with the exception of the moisture (serum) and components dissolved therein. Additionally, the field latex and the concentrated natural rubber latex may include ammonia as a latex stabilizer.

With the method for manufacturing natural rubber of the present technology, first the gel component in the natural rubber is reduced by adding and mixing at least one type of sulfonic acid selected from the group consisting of a monoalkyl sulfonic acid, a polyoxyethylene alkyl ether sulfonic acid, and an alkylbenzene sulfonic acid to the natural rubber latex. When adding an acid such as alkylbenzene sulfonic acid or the like to the natural rubber latex, it is necessary to mix in a manner in which the latex does not solidify. This is because the alkylbenzene sulfonic acid will not be dispersed and mixed uniformly if the latex solidifies, and this will lead to insufficient suppression of the gel component. In order to add the acid such as alkylbenzene sulfonic acid or the like in a manner such that the latex does not solidify, preferably the sulfonic acid is added gradually while thoroughly mixing so that localized increases in a concentration of the sulfonic acid does not occur. Additionally, as necessary, the sulfonic acid may be preferably diluted with water and then added.

In the present disclosure, the "gel component in the natural rubber" refers to an organic solvent insoluble such as toluene or the like. A mechanism of action of the monoalkyl sulfonic acid, the polyoxyethylene alkyl ether sulfonic acid, and the alkylbenzene sulfonic acid used in the present technology on the gel component in the natural rubber is unclear, however it is thought that such sulfonic acids act on a phosphoric acid lipid that is a crosslinking moiety, which is bonded at an end of the natural rubber molecule and forms the gel component. Additionally, such sulfonic acids are different from conventional viscosity stabilizers such as hydroxylamine and the like in that they can be used without health and safety issues. On the other hand, sodium salts and the like of sulfonic acid are known as anionic surfactants. However, when adding and mixing an anionic surfactant with the natural rubber latex in place of the sulfonic acid for use in the present technology, the gel component in the natural rubber cannot be reduced and, thus, the viscosity of the natural rubber cannot be lowered.

The monoalkyl sulfonic acid for use in the present technology is expressed by Formula (1) below.

In Formula (1), $R^1$ is a alkyl group having from 1 to 20 and preferably from 8 to 18 carbons, and may be either a straight chain or branched alkyl group. Preferable examples of such an alkyl group include capryl groups, lauryl groups (n-dodecyl groups), myristyl groups, palmityl groups, stearyl groups, oleyl groups, linolic groups, linolenic groups, and the like.

Additionally, the polyoxyethylene alkyl ether sulfonic acid for use in the present technology is expressed by Formula (2) below.

$$R^2O(CH_2CH_2O)_nSO_3H \quad (2)$$

In Formula (2), $R^2$ is an alkyl group having from 1 to 20 and preferably from 8 to 18 carbons, and n is an integer from 1 to 20 and preferably from 2 to 12. The alkyl group expressed by $R^2$ may be a straight chain or branched alkyl group. Preferable examples of such an alkyl group include capryl groups, lauryl groups (n-dodecyl groups), myristyl groups, palmityl groups, stearyl groups, oleyl groups, linolic groups, linolenic groups, and the like.

The alkylbenzene sulfonic acid for use in the present technology is expressed by Formula (3) below.

$$R^3C_6H_4SO_3H \quad (3)$$

In Formula (3), $C_6H_4$ is a divalent benzene ring; and $R^3$ is an alkyl group having from 1 to 20 and preferably from 8 to 18 carbons, and may be a straight chain or branched alkyl group. Preferable examples of the alkyl group expressed by $R^3$ include capryl groups, lauryl groups (n-dodecyl groups), myristyl groups, palmityl groups, stearyl groups, oleyl groups, linolic groups, linolenic groups, and the like.

Preferable examples of the sulfonic acid for use in the present technology include at least one selected from the group consisting of dodecyl sulfonic acid (lauryl sulfate), dodecyl benzene sulfonic acid, and polyoxyethylene lauryl ether sulfonic acid. Additionally, in addition to the alkylbenzene sulfonic acid (straight chain) described above, a branched chain dodecyl benzene sulfonic acid may be used as the dodecyl benzene sulfonic acid. Each of the sulfonic acids described above may be used alone, or combinations of multiple sulfonic acids may be used.

In the present technology, an added amount of the sulfonic acid is preferably from 0.1 to 5.0 parts by weight and more preferably from 0.1 to 3.0 parts by weight per 100 parts by weight of the solid component of the natural rubber latex. If the added amount of the sulfonic acid is less than 0.1 parts by weight, a sufficient effect of reducing the gel component in the natural rubber will not be obtained and the viscosity of the natural rubber cannot by lowered. Additionally, if the added amount of the sulfonic acid exceeds 5.0 parts by weight, the effect of reducing the gel component will reach a plateau and the latex will become prone to solidification, thus leading to the effect of uniform dispersion becoming unobtainable.

A method for mixing the natural rubber latex and the sulfonic acid in the method for manufacturing natural rubber of the present technology is not particularly limited, but preferably includes stirring at a temperature of from 0 to 100° C. and more preferably from room temperature to 80° C. for preferably from 1 minute to 24 hours and more preferably from 5 minutes to 20 hours. If the mixing temperature is lower than 0° C., mixing/stirring efficiency will decline and, thus, the gel component will not be able to be reduced efficiently. Additionally, if the mixing temperature exceeds 100° C., stability of the colloidal particles of the natural rubber latex will fail and there will be a risk that the rubber particles will not be able to be dispersed in water. If the mixing time is less than 1 minute, the effect of reducing the gel component will be insufficient. Additionally, if the mixing time exceeds 24 hours, the reduction of the gel component will reach a plateau and productivity will decrease.

In the present technology, examples of methods for removing the moisture from the mixture of the natural rubber latex and the sulfonic acid include pulse combustion shock wave drying processes, spray drying processes, air drying processes, reduced pressure drying processes, heat drying processes and the like. Of these, pulse combustion shock wave drying processes are preferable. The pulse combustion shock wave drying process is a drying process in which the natural rubber latex is sprayed into an atmosphere of shock waves generated by pulse combustion, wherein moisture can be removed while allowing the sulfonic acid to remain in the natural rubber. Also, since the drying is done at a low temperature without applying excessive heat to the rubber particles in the natural rubber latex, it is possible to prevent heat degradation and gelling of the natural rubber. The natural rubber dried by the pulse combustion shock wave drying process has a small degree of heat degradation and, therefore, when made into vulcanized rubber, while having various superior mechanical properties, also has a tendency to have a high viscosity and to be difficult to process. Therefore, it is necessary to include the sulfonic acid so as to reduce the gel component and thereby lower the viscosity.

The pulse combustion shock wave drying can be performed using a commercial pulse combustion shock wave drying apparatus (for example, Hypulcon made by Pultech Corporation). With respect to drying conditions, a frequency of the pulse combustion is preferably from 50 to 1,200 Hz and more preferably from 250 to 1,000 Hz; and a temperature of the drying chamber into which the natural rubber latex is sprayed is preferably from 40 to 100° C. and more preferably from 50 to 70° C. Heat degradation of the natural rubber can be prevented by setting the conditions of pulse combustion shock wave drying within the ranges described above.

The natural rubber obtained via the method for manufacturing natural rubber of the present technology has a lowered rubber viscosity and enhanced processability. Therefore, when preparing a rubber composition including the natural rubber, it is either unnecessary to perform mastication or only minor mastication needs to be performed when kneading the various compounding agents. The rubber viscosity of such a natural rubber is not particularly limited, but a Mooney viscosity at 125° C. taken in accordance with Japanese Industry Standard (JIS) K6300 ($MS_1$+4) is preferably from 25 to 65 and more preferably from 30 to 60.

The natural rubber obtained via the method for manufacturing natural rubber of the present technology can be made into a rubber composition in which other diene rubbers, carbon blacks, inorganic fillers, compounding agents, and the like are compounded. Such a rubber composition has superior processability, enhanced quality stability, and superior mechanical properties. Examples of the other diene rubbers include natural rubber, isoprene rubber, various butadiene rubbers, various styrene-butadiene rubbers, various acrylonitrile-butadiene rubbers, and various butyl rubbers. A single other diene rubber may be blended alone or multiple other diene rubbers may be blended. Examples of the inorganic fillers include silica, clay, calcium carbonate, talc, mica, aluminum hydroxide, magnesium carbonate, and the like, and such may be compounded as desired. Examples of the compounding agents include vulcanizing agents or cross-linking agents, vulcanization accelerators, zinc oxide, stearic acid, processing aides, antiaging agents, plasticizers, softeners, lubricants, coloring agents, tackifiers, silane coupling agents, and the like. These inorganic fillers and compounding agents can be blended at conventional general amounts so long as the objects of the present technology are not hindered. A rubber composition can be produced by mixing the components described above using a conventional rubber kneading machine such as a Banbury mixer, a kneader, a roll, or the like.

Second Embodiment

Next, a method for manufacturing natural rubber according to a second embodiment of the present technology will be described.

The method for manufacturing natural rubber according to the second embodiment of the present technology includes performing a treatment to remove the magnesium present in the natural rubber latex prior to adding the sulfonic acid.

This embodiment is the same as the method for manufacturing natural rubber according to the first embodiment described above, except for the performing the treatment to remove the magnesium present in the natural rubber latex prior to adding the sulfonic acid. Therefore, descriptions of aspects that are the same as in the method for manufacturing natural rubber according to the first embodiment are omitted.

With the method for manufacturing natural rubber according to this embodiment, first, in order to remove the magnesium present in the natural rubber latex, a water soluble compound that produces a magnesium salt that has poor solubility in water with the magnesium is added to the natural rubber latex. Thereby, the magnesium in the natural rubber latex becomes a salt and precipitates. By reducing the magnesium content in the natural rubber latex, the viscosity of the natural rubber after drying will be lowered. The water soluble compound that produces the magnesium salt that has poor solubility in water is not particularly limited, but preferably at least one selected from the group consisting of oxalic acid or various oxalic acid salts, various carbonates, boric acid or various boric acid metal salts, various metal hydroxides, phosphoric acid, and various phosphates is used. However, none of these salts contain magnesium. Note that, "these salts" refers to the various oxalic acid salts, various carbonates, various boric acid metal salts, various metal hydroxides, and various phosphates. Additionally, while none of these salts contain magnesium, it is preferable that they also do not include a polyvalent metal that has the potential to create ionic crosslinking structures. Additionally, it is preferable that these salts are not allowed to aggregate so as not to hinder the stability of the natural rubber latex. Examples of particularly preferable water soluble compounds include ammonium phosphate dibasic, ammonium phosphate, ammonium dihydrogen phosphate, and the like. Metals that are present in the natural rubber latex include Mg, Ca, Na, K, Mn, Fe, Cu, Zn, and the like, however, reducing Mg has a particularly high effect on lowering the rubber viscosity.

A method for treating using the water soluble compound that produces the magnesium salt that has poor solubility in water is not particularly limited, but, for example, the water soluble compound is added to the natural rubber latex and preferably mixed/stirred at from 10 to 50° C. for from 0.2 hours to 24 hours. An added amount of the water soluble compound is preferably from 0.2 to 10 parts by weight and more preferably from 0.2 to 5 parts by weight per the amount of the solid component in the natural rubber latex. If the added amount of the water soluble compound is less than 0.2 parts by weight, there is a risk that the magnesium will not be sufficiently removed. If the added amount exceeds 10 parts by weight, a precipitated amount of the magnesium salt will level off. The precipitated magnesium salt is preferably removed from the natural rubber latex using a suitable method such as gravity separating, centrifugation, and the like. The amount of magnesium in the natural rubber latex after the treating with the water soluble compound is preferably 100 ppm and more preferably 50 ppm per the amount of the solid component in the natural rubber latex.

Next, as in the method for manufacturing natural rubber of the first embodiment of the present technology, at least one type of a sulfonic acid selected from the group consisting of a monoalkyl sulfonic acid, a polyoxyethylene alkyl ether sulfonic acid, and an alkylbenzene sulfonic acid is added to and mixed with the water soluble compound treated natural rubber latex in which magnesium has been reduced.

In the present technology, the method for removing the moisture from the mixture of the natural rubber latex and the sulfonic acid described above preferably does not include a step of solidifying using an acid. If a step of solidifying using an acid is included, when the latex is solidified and separated from the moisture, a portion of the added sulfonic acid will be distributed to the aqueous phase. Therefore, there is a risk that the suppression of the gel component will be insufficient.

The natural rubber obtained via the method for manufacturing natural rubber of the present technology has a low magnesium content, a reduced amount of the gel component, and suppresses an increase in the gel component over time. Additionally, the natural rubber obtained via the method for manufacturing natural rubber of the present technology has superior mechanical properties due to the gel component being reduced without breaking apart the molecular chains of the natural rubber. The magnesium content in the natural rubber of the present technology is preferably set to be not more than 100 ppm and more preferably not more than 50 ppm. By setting the magnesium content to be not more than 100 ppm, initial gel can be reduced and rubber viscosity can be lowered. Additionally, by adding a specific sulfonic acid, the gel component is reduced further and, thus, the rubber viscosity is lowered. Moreover, processability is enhanced because the increase in rubber viscosity over time is suppressed. Therefore, when preparing a rubber composition including the natural rubber, it is either unnecessary to perform mastication or only minor mastication needs to be performed when kneading the various compounding agents. Additionally, the superior mechanical properties of natural rubber can be retained because sufficient processability can be obtained without mastication or with only minor mastication.

The present technology is further explained below using examples. However, the scope of the present technology is not limited to these examples.

EXAMPLE 1

As shown by the formulations in Tables 1 and 2, twelve types of natural rubbers (Working Examples 1-1 to 1-7 and Comparative Examples 1-1 to 1-5) were prepared as follows: The sulfonic acid or reagent was dissolved in water and added while slowly stirring so as to be 1.0 or 0.5 parts by weight per 100 parts by weight of the solid component in the natural rubber latex and was then mixed/stirred using a mechanical stirrer. Thereafter, the products were dried under common conditions of spraying at a flow of 2 L/hour into an atmosphere of shock waves generated by pulse combustion (frequency: 1,000 Hz, temperature: 60° C.) using a pulse combustion shock wave drying apparatus (Hypulcon small laboratory dryer made by Pultech Corporation). The type of sulfonic acid or reagent used, added amounts thereof, and mixing/stirring times were varied as shown in Tables 1 and 2. Note that the sulfonic acid and reagent was not added to the natural rubber latex of Comparative Example 1-1 and, after mixing for four hours, the natural rubber latex was dried. Gel component ratios and Mooney viscosities of the obtained twelve types of natural rubber (Working Examples 1-1 to 1-7 and Comparative Examples 1-1 to 1-5) were measured according to the methods described below.

Gel Component Ratio

Approximately 0.1 g of the obtained natural rubber was weighed out and finely cut. Thereafter, 50 ml of toluene was added and the mixture was allowed to sit in a shielded environment at 35° C. for one week. Thereafter, the product was subjected to centrifuging at 10,000 rpm for 40 minutes and the gel component was recovered. Following drying under reduced pressure at 30° C. for 12 hours, the recovered gel component was weighed and the gel component ratio was calculated.

The results were recorded in Tables 1 and 2.

Mooney Viscosity ($ML_{1+4}$)

Mooney viscosities of the obtained natural rubber, in accordance with Japanese Industry Standard (JIS) K6300, was measured with a Mooney Viscosity meter using an S-type rotor under the condition of a preheating time of one minute, a rotor rotation time of four minutes, 125° C., and 2 rpm. The obtained results are shown in Tables 1 and 2. A smaller Mooney viscosity indicates a lower viscosity and, thus, superior molding processability.

The types of raw materials used in Tables 1 and 2 are shown below.

NR latex: Concentrated natural rubber latex; concentrated natural rubber latex manufactured by FELTEX (processed in a centrifuge so that the amount of the solid component was 60 parts by weight)

Dodecyl benzene sulfonic acid: manufactured by Kanto Chemical Co., Inc.

Dodecyl sulfonic acid

Polyoxyethylene lauryl ether sulfonic acid

Hydroxylamine sulfate: manufactured by Tokyo Chemical Industry Co., Ltd.

Sodium dodecyl benzene sulfonic acid: manufactured by Kanto Chemical Co., Inc.

EXAMPLE 2

Modification of the Natural Rubber (Working Examples 2-1 to 2-3)

The addition of (yes/no) and compounded amount (when added) of ammonium phosphate dibasic ("DAHP" in the Tables) to the natural rubber latex (concentrated natural rub-

TABLE 1

|  |  | W.E. 1-1 | W.E. 1-2 | W.E. 1-3 | W.E. 1-4 | W.E. 1-5 | W.E. 1-6 | W.E. 1-7 |
| --- | --- | --- | --- | --- | --- | --- | --- | --- |
| Sulfonic acid | Added? | Yes | Yes | Yes | Yes | Yes | Yes | Yes |
|  | Type | Dodecyl benzene sulfonic acid | Dodecyl benzene sulfonic acid | Dodecyl benzene sulfonic acid | Dodecyl sulfonic acid | Dodecyl sulfonic acid | Polyoxy ethylene lauryl ether sulfonic acid | Polyoxy ethylene lauryl ether sulfonic acid |
|  | Added amount (parts by weight) | 1 | 0.5 | 1 | 1 | 1 | 1 | 1 |
|  | Mixing time (hours) | 4 | 18 | 18 | 4 | 18 | 4 | 18 |
| Gel component ratio (parts by weight) |  | 8.6 | 8.0 | 7.9 | 9.4 | 8.7 | 10.2 | 9.6 |
| Mooney Viscosity (—) |  | 42 | 41 | 40 | 39 | 39 | 42 | 41 |

Notes to Table 1: "W.E." is an abbreviation for "Working Example".

TABLE 2

|  |  | C.E. 1-1 | C.E. 1-2 | C.E. 1-3 | C.E. 1-4 | C.E. 1-5 |
| --- | --- | --- | --- | --- | --- | --- |
| Reagent | Added? | No | Yes | Yes | Yes | Yes |
|  | Type | — | Hydroxylamine sulfate | Hydroxylamine sulfate | Sodium dodecyl benzene sulfonic acid | Sodium dodecyl benzene sulfonic acid |
|  | Added amount (parts by weight) | — | 1 | 1 | 1 | 1 |
|  | Mixing time (hours) | 4 | 4 | 18 | 4 | 18 |
| Gel component ratio (parts by weight) |  | 29.3 | 9.5 | 11.7 | 26.8 | 29.0 |
| Mooney Viscosity (—) |  | 52 | 39 | 40 | 52 | 53 |

Notes to Table 2: "C.E." is an abbreviation for "Comparative Example".

ber latex: concentrated natural rubber latex manufactured by FELTEX; processed in a centrifuge so that the amount of the solid component was 60 parts by weight) was set to the formulations shown in Table 3, and stirred slowly at 37° C. for 10 hours. The added amount of the DAHP was set as a weight ratio (parts by weight) with relation to the amount of the solid component in the natural rubber latex. Additionally, the DAHP was not added in Reference Examples 2-1 and 2-2. After allowing the mixture to sit for a short while following stirring and removing the precipitate, the remaining mixture was again subjected to centrifugation using a centrifuge for 30 minutes at 12,000 rpm. Note that Reference Examples 2-1 and 2-2 are examples by which the effects of the present technology are confirmed.

The addition of (yes/no) and compounded amount (when added) of dodecyl benzene sulfonic acid ("DBSA" in the Tables) to the obtained cream product was set as shown in Table 3 and treatment was performed. The DBSA was added by dissolving the DBSA in water and slowly stirring while adding the solution to the cream product; a weight ratio (parts by weight) in relation to the solid component in the natural rubber latex was adjusted so as to be the values shown in Table 3; and a mechanical stirrer was used to slowly mix/stir at room temperature. Note that, the DBSA was not added in Reference Example 2-1 and Comparative Examples 2-1 to 2-3.

The mixture of the natural rubber latex and the DBSA was sprayed and dried using a pulse combustion shock wave drying apparatus (Hypulcon small laboratory dryer made by Pultech Corporation) in an atmosphere of shock waves generated by pulse combustion (frequency: 1,000 Hz, temperature 60° C.) at a flow rate of 2 L/hour. Thus, eight types of natural rubber (Working Examples 2-1 to 2-3, Reference Examples 2-1 and 2-2, and Comparative Examples 2-1 to 2-3) were produced.

The magnesium content, and gel content and post-accelerated storage hardening test gel content of the obtained eight types of natural rubber (Working Examples 2-1 to 2-3, Reference Examples 2-1 and 2-2, and Comparative Examples 2-1 to 2-3) were measured according to the methods described below.

Mg Content

After analyzing the obtained eight types of natural rubber using a wet ashing apparatus, the magnesium contents of the natural rubbers were measured via inductively coupled plasma-atomic emission spectroscopy (ICP analysis). The measurement results of the magnesium content (ppm) therein was recorded in Table 3.

Gel Content and Post-Accelerated Storage Hardening Test Gel Content

An accelerated storage hardening test was performed in which the obtained eight types of natural rubber were each placed in a desiccator filled with phosphorus pentoxide ($P_2O_5$) for different storage times at a temperature of 60° C. The storage times were set to 16, 37, 85, and 133 hour parameters.

Approximately 0.1 g of the obtained natural rubber in an initial state and in a post-accelerated storage hardening test was weighed out and finely cut. Thereafter, 50 ml of toluene was added and the mixture was allowed to sit in a shielded environment at 35° C. for one week. Thereafter, the product was subjected to centrifuging at 10,000 rpm for 40 minutes and the gel component was recovered. Following drying under reduced pressure at 30° C. for 12 hours, the recovered gel component was weighed and the gel component content (parts by weight) was calculated. The results were recorded in Table 3. Moreover, relationships between the storage times and gel contents of Working Examples 2-1 to 2-3, Reference Examples 2-1 and 2-2, and Comparative Example 2-1 are plotted in FIG. 1. Note that in Table 3 and FIG. 1, instances when the storage time is 0 hours refers to the initial state of the natural rubber.

TABLE 3

|  | R.E. 2-1 | R.E. 2-2 | C.E. 2-1 | W.E. 2-1 | C.E. 2-2 | W.E. 2-2 | C.E. 2-3 | W.E. 2-3 |
|---|---|---|---|---|---|---|---|---|
| DAHP Added? | No | No | Yes | Yes | Yes | Yes | Yes | Yes |
| DAHP (parts by weight) | — | — | 0.2 | 0.2 | 0.5 | 0.5 | 1.0 | 1.0 |
| DBSA Added? | No | Yes | No | Yes | No | Yes | No | Yes |
| DBSA (parts by weight) | — | 1.0 | — | 1.0 | — | 1.0 | — | 1.0 |
| Measurement results | | | | | | | | |
| Magnesium content (ppm) | 339 | 362 | 19.1 | 18.9 | 22.3 | 21.6 | 22.2 | 24.1 |
| Storage time (hours) | Gel content (parts by weight) | | | | | | | |
| 0 | 22.7 | 10.6 | 18.0 | 10.3 | 32.6 | 7.5 | 30.2 | 4.7 |
| 16 | 84.8 | 72.1 | 76.6 | 53.8 | 75.3 | 47.6 | 80.1 | 49.2 |
| 37 | 82.9 | 74.5 | 79.4 | 58.6 | 75.6 | 54.1 | 76.5 | 51.4 |
| 85 | 90.6 | 87.2 | 86.9 | 56.7 | 86.1 | 60.6 | 82.4 | 57.2 |
| 133 | 88.6 | 86.9 | 82.4 | 62.9 | 86.7 | 63.2 | 86.7 | 55.2 |

Notes to Table 3: "R.E." is an abbreviation for "Reference Example", "C.E." is an abbreviation for "Comparative Example", and "W.E." is an abbreviation for "Working Example".

Preparation of Rubber Compositions (Working Examples 2-4 to 2-6)

As described above, using each of the eight types of modified natural rubber (Working Examples 2-1 to 2-3, Reference Examples 2-1 and 2-2, and Comparative Examples 2-1 to 2-3), the eight types of rubber compositions (Working Examples 2-4 to 2-6, Reference Examples 2-3 and 2-4, and Comparative Examples 2-4 to 2-6) shown in Table 4 were prepared. Each of the rubber compositions had the composition shown below in common, with the exception that the type of natural rubber used was varied. Each of the rubber compositions was prepared by first weighing compounding components other than sulfur and vulcanization accelerators, then kneading for five minutes in a 1.7 liter sealed Banbury mixer, discharging a master batch at a temperature of 150° C., and cooling to room temperature. The sulfur and the vulcanization accelerators were then added to the master batch and mixed in the 1.7 liter sealed Banbury mixer to prepare the rubber composition.

Common Formulation of the Rubber Compositions

Natural Rubber: (Working Examples 2-1 to 2-3, Reference Examples 2-1 and 2-2, and Comparative Examples 2-1 to 2-3): 100 parts by weight Carbon black: (Shoblack N339, manufactured by Showa Cabot K.K.): 50 parts by weight Zinc oxide: (Zinc Oxide #3, manufactured by Seido Chemical Industry Co., Ltd.): 5 parts by weight Stearic acid: (Beads Stearic Acid YR, manufactured by NOF Corp.): 2 parts by weight Antiaging agent 1: (Santoflex 13, manufactured by Flexsys): 2 parts by weight Antiaging agent 2: (Nocrac 224, manufactured by Ouchi Shinko Chemical Industrial Co., Ltd.): 2 parts by weight Sulfur: (150 mesh "Golden Flower" Oil Treated Sulfur Powder, manufactured by Tsurumi Chemical): 2 parts by weight Vulcanization accelerator: (NOCCELER NS—F, manufactured by Ouchi Shinko Chemical Industrial Co., Ltd.): 1 part by weight The obtained eight types of rubber composition (Working Examples 2-4 to 2-6, Reference Examples 2-3 and 2-4, and Comparative Examples 2-4 to 2-6) were formed into vulcanized sheets by press vulcanizing for 30 minutes at 150° C.

using a mold having a predetermined shape. Using these vulcanized sheets, a tensile test was conducted and abrasion resistance was evaluated according to the methods described below.

Tensile Test

JIS 3 Dumbbell shaped samples, in accordance with Japan Industry Standard (JIS) K6251, were cut from the obtained vulcanized sheets. Using these samples, in accordance with JIS K6251, a tensile test was performed at a pulling speed of 500 mm/min and a temperature of 20° C. 300% modulus (MPa), tensile breaking strength (MPa), and tensile breaking elongation (%) were measured. The results were recorded in Table 4.

Abrasion Resistance

In accordance with Japan Industry Standard (JIS) K6264, using the obtained vulcanized sheets, a Lambourn abrasion resistance test machine (manufactured by Iwamoto Quartz GlassLab Co., Ltd.) was used to measure an amount of abrasion under the following conditions: temperature=20° C., load=15 N, slip ratio 50%, time=10 minutes. The obtained results were recorded in Table 4 as an index with a value for Reference Example 2-1 being 100. A larger index value indicates superior abrasion resistance.

TABLE 4

|  |  | R.E. 2-3 | R.E. 2-4 | C.E. 2-4 | W.E. 2-4 | C.E. 2-5 | W.E. 2-5 | C.E. 2-6 | W.E. 2-6 |
|---|---|---|---|---|---|---|---|---|---|
| Type of Natural Rubber | | R.E. 2-1 | R.E. 2-2 | C.E. 2-1 | W.E. 2-1 | C.E. 2-2 | W.E. 2-2 | C.E. 2-3 | W.E. 2-3 |
| Rubber Composition Physical Properties | 300% Modulus (MPa) | 3.7 | 3.4 | 3.6 | 3.0 | 3.7 | 3.3 | 3.7 | 3.0 |
| | Tensile breaking strength (MPa) | 27.7 | 26.9 | 26.1 | 27.0 | 27.0 | 27.5 | 27.5 | 26.9 |
| | Tensile breaking elongation (%) | 455 | 467 | 432 | 391 | 447 | 495 | 302 | 470 |
| | Abrasion resistance (index) | 100 | 98 | 87 | 99 | 104 | 113 | 94 | 104 |

Notes to Table 4: "R.E." is an abbreviation for "Reference Example", "C.E." is an abbreviation for "Comparative Example", and "W.E." is an abbreviation for "Working Example".

What is claimed is:

1. A method for manufacturing natural rubber comprising: adding to a natural rubber latex at least one sulfonic acid selected from the group consisting of dodecyl sulfonic acid, dodecyl benzenesulfonic acid, and polyoxyethylene lauryl ether sulfate; and, thereafter, drying and removing moisture from the mixture of the natural rubber latex and the sulfonic acid by spraying the natural rubber latex mixture into an atmosphere of shock waves generated by pulse combustion, removing magnesium present in the natural rubber latex, wherein the treatment for removing the magnesium in the natural rubber latex comprises adding a water soluble compound, which produces a magnesium salt that has poor solubility in water with the magnesium, to the natural rubber latex, the water soluble compound being selected from the group consisting of oxalic acid, oxalic acid salts, carbonate, boric acid, boric acid metal salt, metal hydroxide, and phosphoric acid; wherein the oxalic acid salt, the carbonate, the boric acid metal salt, and the metal hydroxide do not comprise magnesium.

2. The method for manufacturing natural rubber according to claim 1, wherein the mixture of the natural rubber latex and the sulfonic acid is stirred at a temperature of from 0 to 100° C. for from 1 minute to 24 hours.

3. The method for manufacturing natural rubber according to claim 1, wherein from 0.1 to 5.0 parts by weight of the sulfonic acid is added per 100 parts by weight of a solid component of the natural rubber latex.

4. The method for manufacturing natural rubber according to claim 1, wherein the treatment for removing magnesium present in the natural rubber latex is performed prior to adding the sulfonic acid.

5. The method for manufacturing natural rubber according to claim 1, wherein adding to a natural rubber latex at least one type of sulfonic acid further comprises diluting the sulfonic acid with water prior to adding, and wherein adding to a natural rubber latex at least one type of sulfonic acid comprises gradually adding the sulfonic acid to the natural latex rubber while thoroughly mixing.

6. The method for manufacturing natural rubber according to claim 1, wherein from 0.1 to 3.0 parts by weight of the sulfonic acid is added per 100 parts by weight of a solid component of the natural rubber latex, and wherein the mixture of the natural rubber latex and the sulfonic acid is stirred at a temperature of from room temperature to 80° C. for from 5 minutes to 20 hours.

7. The method for manufacturing natural rubber according to claim 1, wherein the moisture is removed by spraying the natural rubber latex mixture into an atmosphere of shock waves generated by pulse combustion at a frequency of from 50 to 1,200 Hz in a drying chamber having a temperature of from 40 to 100° C.

8. The method for manufacturing natural rubber according to claim 1, wherein a Mooney viscosity at 125° C. of the natural rubber taken in accordance with Japanese Industry Standard (JIS) K6300 (MS1+4) is from 25 to 65.

9. The method for manufacturing natural rubber according to claim 1, wherein the treatment for removing magnesium present in the natural rubber latex is performed prior to adding the sulfonic acid, the treatment including reducing an amount of magnesium in the natural rubber latex to 100 ppm or less per an amount of a solid component in the natural rubber latex.

10. The method for manufacturing natural rubber according to claim 1, wherein the sulfonic acid is selected from the group consisting of dodecyl benzenesulfonic acid and polyoxyethylene lauryl ether sulfate.

* * * * *